Jan. 28, 1936.  R. F. ZAK  2,029,209
DOOR SERVICE INDICATOR
Filed March 11, 1935   2 Sheets-Sheet 1
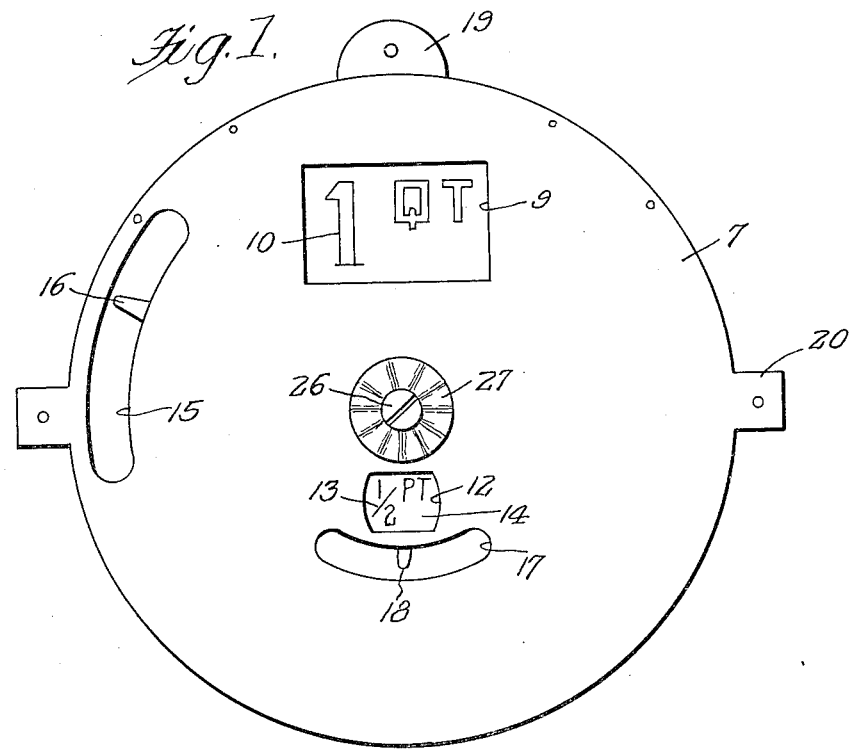
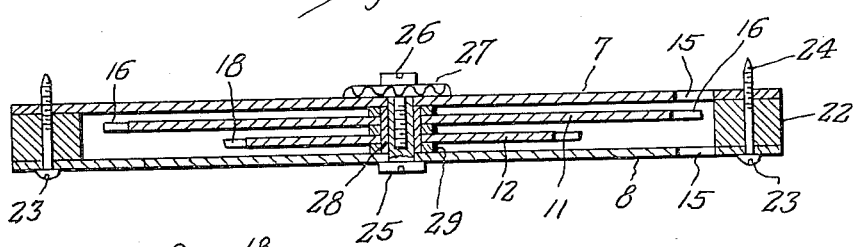
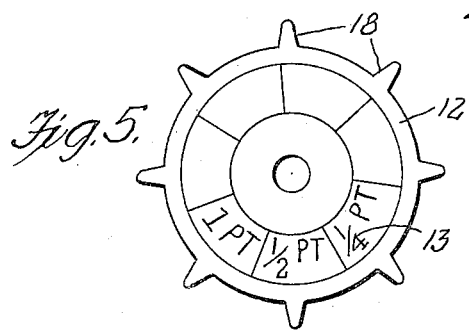
Inventor
Richard F. Zak,
By *Clarence A. O'Brien*
Attorney Jan. 28, 1936.  R. F. ZAK  2,029,209
DOOR SERVICE INDICATOR
Filed March 11, 1935   2 Sheets-Sheet 2
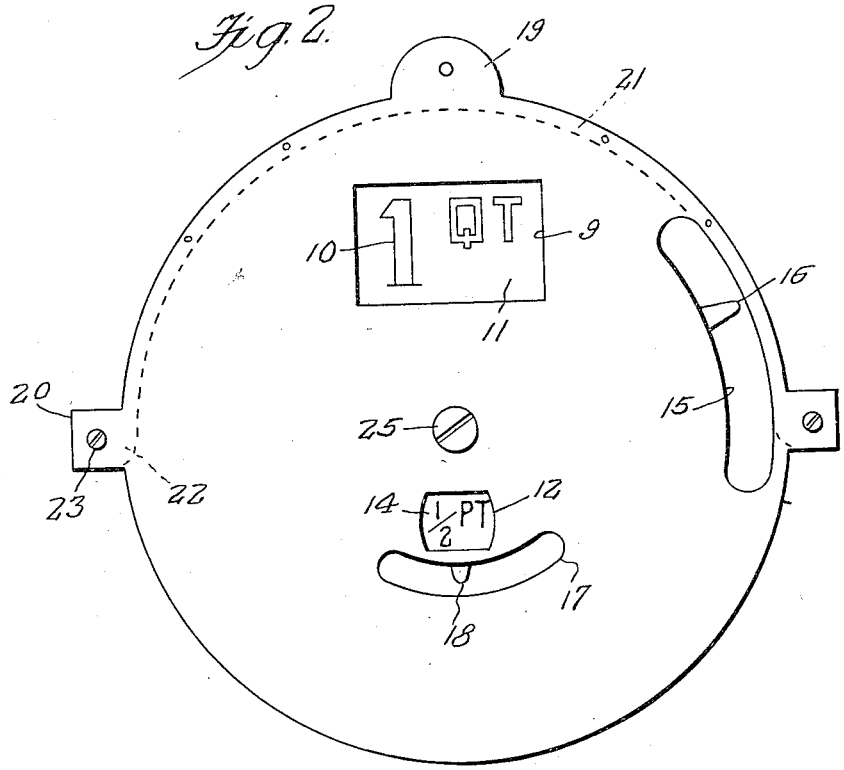
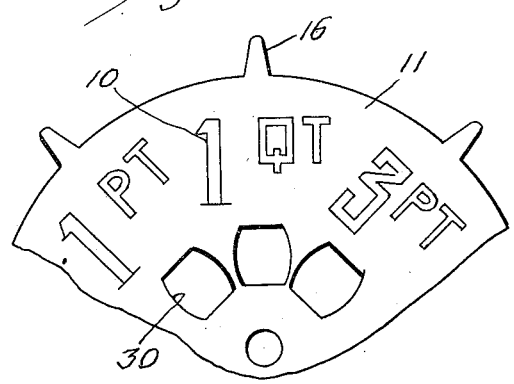
Inventor
Richard F. Zak,
By Clarence A. O'Brien
Attorney Patented Jan. 28, 1936

2,029,209

UNITED STATES PATENT OFFICE 2,029,209

DOOR SERVICE INDICATOR

Richard Frank Zak, Westfield, Mass.

Application March 11, 1935, Serial No. 10,542

3 Claims. (Cl. 40—70)

This invention relates to that class of charts and indicators of the distant visible type generally employed in homes for door service, and has particular reference to a simple and economical device for use indoors or out-of-doors for the purpose of notifying a milk man of the quantity of milk or cream desired by the housewife.

Needless to say, I am aware of the fact that there are many types and forms of notification cards, dials and similar indicators for use in the present day practice of delivering ice, milk and the like. It follows, therefore, that the present invention has reference to a seemingly novel and structurally improved home accessory susceptible of expeditious and adequate use in displaying the quantity of milk or cream to be ordered by the housewife from the milkman.

In reducing the invention to practice and perfecting the preferred embodiment thereof, I have discovered an ingenious little device which may be hung from the inside of a window, or placed on the outside of the building at a point convenient to be adjusted by the user and to be readily observed by the milkman, the invention being either of a single or double acting type so that it may be satisfactorily used for interior and exterior purposes.

Briefly, the preferred arrangement comprises a casing having a pair of spaced parallel plates and selectively turnable properly marked dials rotatably mounted therebetween so that they may be either one or both brought into play to display the order and to permit it to be conveniently observed by the milk delivery man.

Other features and advantages will become more readily apparent from the following description and accompanying illustrative drawings.

In the pictorial drawings, wherein like numerals are employed to designate like parts or details throughout the views:

Figure 1 is what may be designated as a rear or inside elevational view of the invention constructed in accordance with my ideas.

Figure 2 is a view of the reverse or outside thereof.

Figure 3 is a central horizontal sectional view.

Figure 4 is a fragmentary view of the milk indicating dial.

Figure 5 is an elevational view of the cream ordering or indicating dial.

Figure 6 is an elevation of a fragmentary portion of a spacing and connecting member.

The numerals 7 and 8 designate respectively the inside and outside face plates or disks. These are of duplicate construction. The relatively large opening 9 at the top constitutes a window or sight opening through which the indicia 10 on the milk dial 11 may be visualized. The smaller opening near the bottom and indicated at 12 constitutes the sight opening through which the indicia 13 on the cream disk or dial 14 is shown. The marginal arcuate slots 15 of which there are two in registration are employed for adjusting the circumferentially spaced radial turning fingers 16 on the milk dial. The segmental slots 17 of which there are two in registration, provide the means affording access to the similar actuating or turning fingers or studs 18 on the cream disk 14. One of the dials is provided with an attaching ear 19, this being apertured so that it may be nailed or otherwise fastened to a window when the device is used on the interior of the building. The numeral 20 designates diametrically opposed complemental lugs or ears for fastening the disks or plates together in spaced parallelism.

The disks 7 and 8 are maintained in proper spaced relation primarily through the instrumentality of a substantially semi-circular band 21 located between the upper half-portions of the disks, said disks being properly secured thereto. This band terminates in block-like heads or enlargements 22 which are disposed between the ears 20 and fastened thereto by fastening screws 23 which pass through the parts as illustrated in Figure 3. These fastenings 23 not only serve to maintain the parts in assembled relation, but the threaded ends 24 may be fastened in a door or frame, or other stationary support on the outside of the building when the device is used externally. The entire half portion between the lower parts of the disks is open to permit access to be had to the dials for turning them by way of a screw driver or the like in case they become jammed or hard to turn.

Referring to Figure 3 it will be observed that the numeral 25 designates a centralized bolt having a hollow stem or socket to receive the screw threaded shank of the companion bolt 26 on the other side. The numeral 27 is merely a crimped resilient washer which serves to provide the desired resilient binding action. This is in a sense a lock washer. The interconnected stem portions of the two bolts serve as an axle to accommodate a bushing 28 which functions as a hub, the two dials 11 and 12 being fastened thereon and spaced apart by washers 29. Obviously the disk 11 is quite large and the disk 12 is somewhat smaller in diameter. Or stated otherwise, the disk 11 is of such diameter that the finger pieces or lugs project to a position to register with the slots 15 and 17 respectively. Then, too, in order that the numerals on the cream disk 12 may be seen from either side, the larger disk, that is the milk disk 11 is provided with properly proportioned and spaced windows 30 as shown in Figure 4.

Thus it will be seen that the two bolts 25 and 26 are centrally fastened to secure the disks together partially and to function as an axle on which the bushing or hub 28 is turnable, the hub carrying the two indicating dials 11 and 12. The dials are proportioned so that the indicia 10 and 13 thereon may be registered with the sight openings 9 and 12.

When the device is used on the interior the attaching gear 19 is secured to a window frame or the like. Thus the indicia may be seen from the exterior as well as from the interior so that it is unnecessary for the user to go to the outside to adjust it. When it is used on the exterior however, it is fastened to a wall, frame, door or the like by way of the anchoring screws 23. Under this arrangement it is necessary to go to the outside when making the adjustments and this is the reason the invention is referred to as of a duplex character.

The invention is such as to be simple and economical and comparatively light and sturdy. It can be made from proper material such as cardboard, aluminum or light weight metal. In fact any suitable material may be employed for its construction.

The gist of the invention is in the provision of the spaced disk-like face plates 7 and 8 spaced apart by the semi-circular rim member 21 terminating in heads 22 located between the complemental registering ears 20. This leaves the entire bottom or half portion of the casing open so that it is possible to get in from the bottom to make adjustments of the dials in case they hang by friction or otherwise. The main adjustment by the housewife, however, is made by way of the fingers 16 and 18 projecting into their respective slots 15 and 17. It is evident, therefore, that the invention possesses such indispensable features and advantages capable of enabling it to fulfill the desired functions in a highly practicable and satisfactory manner. I shall not attempt to enumerate the various commercial advantages since, in the final analysis the merit of the invention is reflected by the succeeding claims.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

Having thus described the invention, what is claimed as new is:

1. In a door service and commodity ordering device of the class described, a casing having its upper half portion closed around its marginal area and its lower portion open to permit access to be had to the space on the interior thereof, said casing being provided centrally thereof with oppositely disposed apertures, a cylindrical bushing between the sides of said casing in registry with said apertures, an internally threaded hollow bolt extending into said bushing from one side of said casing, a bolt screw-threaded into said hollow bolt from the other side of said casing, a crimp washer between the head of said last named bolt and the adjacent side of the casing, a pair of companion marked dials mounted for rotation on said bushing, the perimeter portions of said dials being accessible through the open marginal portion of said casing to facilitate turning of the dials if and when said dials hang or become otherwise bound in a manner to hinder expeditious adjustment thereof.

2. In a device of the class described, a casing embodying spaced parallel front and rear plates, said plates being provided with a pair of aligned sight openings of relatively great area, with a pair of registering relatively smaller sight openings, said plates being further provided with a pair of aligned slots for cooperation with said large sight opening, and a pair of similar aligned slots for cooperation with the smaller sight opening, a milk ordering disk mounted for rotation in the casing and having indicia on both sides adapted to be displayed through said large sight openings, said milk disk being provided with marginal operating fingers projectable for operation to a point within the vicinity of said first named slots for convenient turning of the disk, a smaller cream disk mounted for rotation in spaced parallelism to said first named disk and between said casing plates and having indicia on opposite sides selectively registerable with the small sight opening, said first named disk being provided with apertures registerable with the indicia on said cream disk, and said cream disk being provided with marginal fingers projecting to points within the vicinity of said second named slots for convenient actuation purposes.

3. As a component part of a device of the class described, a casing made up of spaced parallel disk-like front and rear plates, said plates being provided with diametrically opposed outstanding marginal ears, being formed with a plurality of sight openings and slots, one of the plates being provided with an apertured hanger extension, a substantially semi-circular band located between the marginal portions of the plates to facilitate securing the plates together and maintaining them in spaced relationship, the ends of said band terminating in outstanding laterally directed heads disposed between said diametrically opposed pairs of ears, and fastening screws passing through the ears and heads and having the double function of aiding and holding the parts together as well as in bodily and securely fastening the device as a unit on the outside of a building in the manner and for the purposes described.

RICHARD FRANK ZAK.